(12) United States Patent
Mukasa

(10) Patent No.: US 7,978,949 B2
(45) Date of Patent: Jul. 12, 2011

(54) OPTICAL FIBERS AND OPTICAL TRANSMISSION SYSTEMS

(75) Inventor: Kazunori Mukasa, Tokyo (JP)

(73) Assignee: The Furukawa Electric Co., Ltd., Tokyo (JP)

( * ) Notice: Subject to any disclaimer, the term of this patent is extended or adjusted under 35 U.S.C. 154(b) by 0 days.

(21) Appl. No.: 12/429,924

(22) Filed: Apr. 24, 2009

(65) Prior Publication Data

US 2009/0252470 A1 Oct. 8, 2009

Related U.S. Application Data

(63) Continuation-in-part of application No. 12/268,527, filed on Nov. 11, 2008, now abandoned.

(30) Foreign Application Priority Data

Nov. 13, 2007 (JP) ................................. 2007-294757

(51) Int. Cl.
*G02B 6/036* (2006.01)
(52) U.S. Cl. .......................... 385/128; 385/126; 385/127
(58) Field of Classification Search ........... 385/126–128
See application file for complete search history.

(56) References Cited

U.S. PATENT DOCUMENTS

| | | | |
|---|---|---|---|
| 6,611,647 B2 * | 8/2003 | Berkey et al. ................. | 385/123 |
| 6,724,966 B2 | 4/2004 | Mukasa | |
| 6,760,527 B2 * | 7/2004 | Berkey et al. ................. | 385/123 |
| 6,810,186 B2 | 10/2004 | Mukasa | |
| 6,983,094 B2 | 1/2006 | Mukasa | |
| 7,006,742 B2 * | 2/2006 | Takahashi et al. ............ | 385/122 |
| 7,046,885 B2 * | 5/2006 | Sugizaki et al. .............. | 385/123 |
| 7,082,243 B2 * | 7/2006 | Bickham et al. ............. | 385/127 |
| 7,164,830 B2 * | 1/2007 | Hiroishi et al. ............... | 385/123 |
| 7,272,289 B2 * | 9/2007 | Bickham et al. ............. | 385/128 |
| 2003/0086667 A1 * | 5/2003 | Berkey et al. ................. | 385/123 |
| 2003/0210877 A1 * | 11/2003 | Berkey et al. ................. | 385/123 |
| 2005/0213907 A1 * | 9/2005 | Hiroishi et al. ............... | 385/123 |
| 2006/0008221 A1 * | 1/2006 | Takahashi et al. ............ | 385/124 |
| 2007/0077016 A1 * | 4/2007 | Bickham et al. ............. | 385/128 |

FOREIGN PATENT DOCUMENTS

| | | |
|---|---|---|
| JP | 2005-234433 | 9/2005 |
| JP | 2005-311486 | 11/2005 |

OTHER PUBLICATIONS

Grüner-Nielsen, Lars, et al. "Dispersion-Compensating Fibers" Journal of Lightwave Technology, vol. 23, Issue 11, pp. 3566-3579 (Nov. 2005).

(Continued)

*Primary Examiner* — K. Cyrus Kianni
(74) *Attorney, Agent, or Firm* — Oblon, Spivak, McClelland, Maier & Neustadt, L.L.P.

(57) ABSTRACT

Optical fibers and optical transmission systems, which are capable of broadband and large capacity single-mode optical transmission, and have low macrobends are provided.
The optical fiber made from pure silica comprising a core region, a cladding region at the circumference of the core region a coating layer made from a resin at the circumference of the cladding region, and having a cutoff wavelength of shorter than 1530 nm, and positive dispersion at 1550 nm, bending loss of less than 10 dB/m at a bending diameter of 20 mm, and an effective core area of 120 $\mu m^2$.

6 Claims, 7 Drawing Sheets

OTHER PUBLICATIONS

Nagayama, K., et al. "Ultra-low-loss (0.1484 dB/km) pure silica core fibre and extension of transmission distance" Electronics Letters, vol. 38, Issue 20, pp. 1168-1169 (Sep. 2002).

Aikawa, Kazuhiko, et al. "Single-mode Optical Fiber With Effective Core Area Larger Than 160μm$^2$" ECOC'99, I-302 to I-303 (Sep. 1999).

Tsukitani, Masao, et al. "Ultra Low Nonlinearity Pure-Silica-Core Fiber with an Effective Area of 211μm$^2$ and Transmission Loss of 0.159dB/km" ECOC'02, 3.2.2 (2002).

Bjarklev, A. and Andreasen, S. B. "Microbending Characterisation of Optical Fibres From Artificially Induced Deformation" Electronics Letters, vol. 25, Issue 6, pp. 417-419 (Mar. 1989).

* cited by examiner

US 7,978,949 B2

OPTICAL FIBERS AND OPTICAL TRANSMISSION SYSTEMS

CROSS-REFERENCES TO RELATED APPLICATIONS

This application is a continuation-in-part application of U.S. application Ser. No. 12/268,527 filed Nov. 11, 2008, and claims the benefit of U.S. application Ser. No. 12/268,527, the entire contents of which are incorporated herein by reference.

This application also claims the benefit of priority from Japanese Patent Application No. 2007-294757 filed Nov. 13, 2007, the entire contents of which are incorporated herein by reference.

TECHNICAL FIELD

The present invention is related to optical fibers, and optical transmission systems that use the optical fibers as optical transmission lines.

BACKGROUND OF THE INVENTION

In terrestrial transmission systems, large capacity optical transmission via Wavelength Division Multiplexing (WDM) transmission in C-band is investigated carefully. In such systems, optical transmission lines are constructed using optical fibers on the ground. The C-band refers to wavelengths between 1530 and 1565 nm. As for optical transmission lines in terrestrial transmissions, single-mode optical fibers, which have a positive chromatic dispersion of approximately 4~16 ps/(nm·km) at 1550 nm, are primarily used. Above all, because of its high manufacturing capability, low loss, and low non-linear characteristics, standard single-mode optical fibers (SMF) are currently the most popular optical fiber used in optical transmissions. SMF has chromatic dispersion of 16 ps/(nm·km) at 1550 nm. Dispersion was a significant issue in the past; however, thanks to the development of module-type dispersion compensating fibers, the issue was resolved (refer "L. Gruner-Nielsen et al., "Dispersion-Compensating Fibers" J. Lightwav. Tech., Vol. 23, No. 11, pp. 3566-3579 (2005)").

Also, SMF has positive chromatic dispersion around 1310 nm, and cutoff wavelength of shorter than 1300 nm. These make the SMF to be used in transmitting a broadband WDM optical transmission in single-mode. Recently, because of SMF with a lower absorption peak (caused by OH-ions in the optical fiber) at 1380 nm, and with the development of amplifying device technology, SMF can now use the C-band, the L-band (wavelengths of 1565~1620 nm), and the S-band (wavelengths of 1460~1530 nm) for optical transmission.

To increase optical transmission distance and transmission capacity by using SMF, it is desirable to further reduce nonlinearity of the optical fiber, which causes deterioration of optical signals. An effective core area of conventional SMF is approximately 80 $\mu m^2$. However, if the effective core area is further increased, then the energy density of light within the core decreases. It makes possible to create an optical fiber with even lower nonlinearity. For example, as optical fibers to be used in submarine transmission, optical fibers with their effective core areas of approximately 118 $\mu m^2$ are disclosed in "K. Nagayama et al., "Ultra-low-loss (0.1484 dB/km) pure silica core fibre and extension of transmission distance" Electron. Lett. Vol. 35, Issue 20 pp. 1168-1168 (2002)". Also, optical fibers with even larger effective core areas are disclosed in "K. Aikawa et al., "Single-mode Optical Fiber with Effective Core Area Larger than 160 $\mu m^2$" ECOC '99, I, 302-303 (1999)" and "M. Tsukitani et al., "Ultra Low Nonlinearity Pure-Silica-Core Fiber with an Effective Area of 211 $\mu m^2$ and Transmission Loss of 0.159 dB/km" ECOC '02, 3.2.2 (2002)".

However, the effective core areas of the above conventional optical fibers are increased by making their cutoff wavelength longer and/or increasing their bending loss. They create issues such as narrow useful wavelength band for single-mode transmission and increase in macrobending loss.

SUMMARY OF THE INVENTION

The objective of the present invention is to provide optical fibers and optical transmission systems that are capable of broadband and large capacity single-mode optical transmission, and have low macrobending loss.

To solve the above issue and achieve the objective, the optical fiber of the present invention made from fused silica comprises: a core region; a cladding region at the circumference of the core region; a coating layer made from a resin at the circumference of the cladding region; and has a cutoff wavelength of shorter than 1530 nm; positive dispersion at a wavelength of 1550 nm, bending loss of less than 10 dB/m at a bending diameter of 20 mm at the wavelength of 1550 nm; and an effective core area of 120 $\mu m^2$ at the wavelength of 1550 nm.

The optical transmission system of the present invention uses optical fibers as the optical transmission line, and comprises the optical fibers mentioned above and a dispersion-compensating fiber, which compensates chromatic dispersion of the optical fiber by having a negative chromatic dispersion at a wavelength of 1550 nm.

BRIEF DESCRIPTION OF THE DRAWINGS

Referring now to the drawings.

DETAIL DESCRIPTION

In the following, a detailed description of embodiments of optical fibers and optical transmission systems according to the present invention is described by referencing the above-mentioned figures. While various embodiments of the present invention are described below, it should be understood that they are presented by way of example, and are not intended to limit the scope of the present invention. Also, in the specification, bending loss is the loss caused by a bending diameter of 20 mm, and a cutoff wavelength is the fiber cutoff wavelength defined in the International Telecommunication Union Telecommunication Standardization Sector (ITU-T) G.650.1. If terms are not defined in the specification, those terms are accordance with definitions and measuring methods of the ITU-T G.650.1.

First Embodiment of the Present Invention

Figure 1:
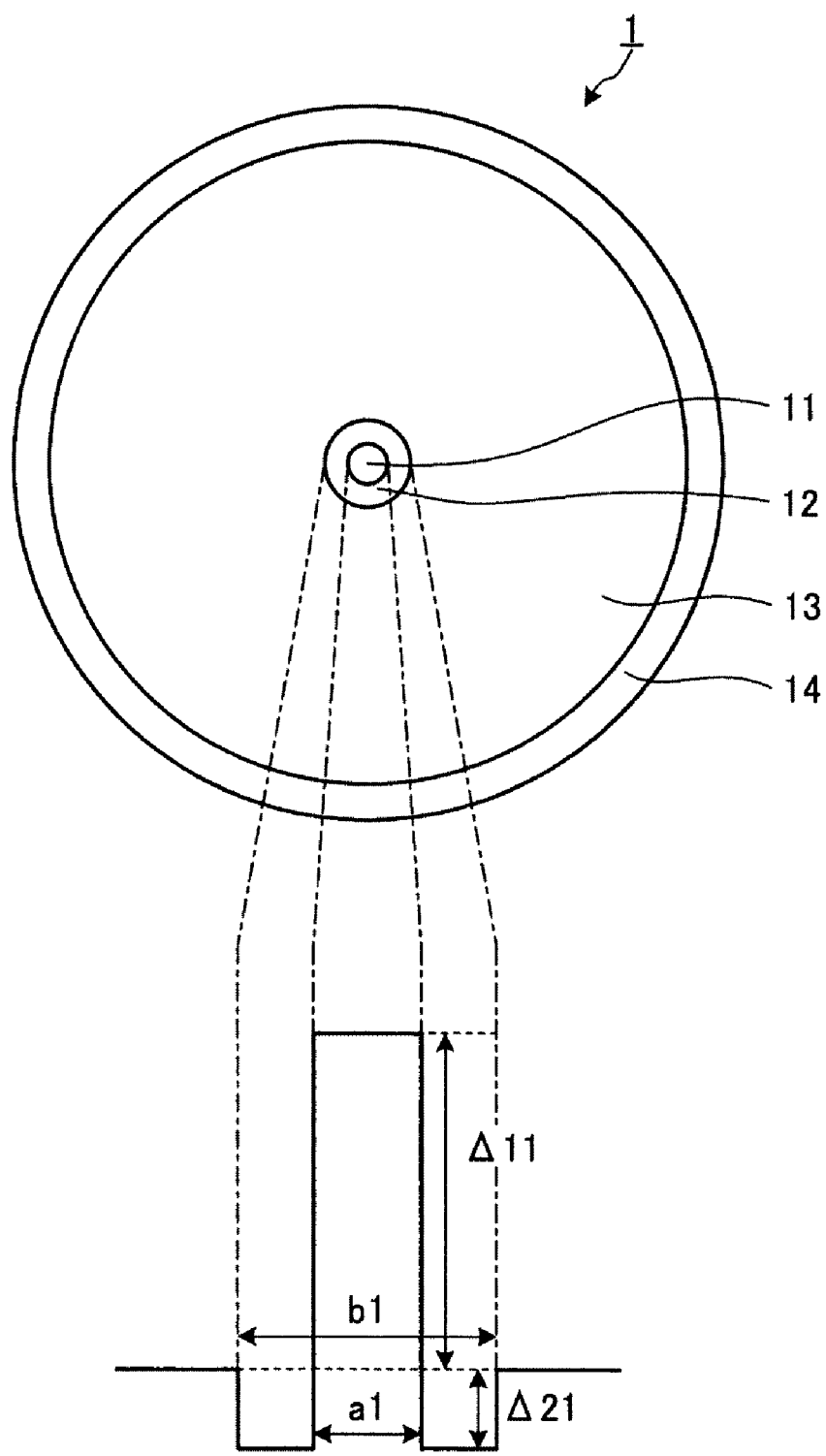
FIG. 1 is a diagram of a area and a refractive index profile of an optical fiber, which relates to a first embodiment of the present invention.

FIG. 1 is a diagram of an effective core area and a refractive index profile of an optical fiber which relates to a first embodiment of the present invention. As shown in FIG. 1, optical fiber 1: is made from silica-based glass, has a center core region 11 and an outer core layer 12 at a center region, a cladding region 13 at the circumference of the core region, and a coating layer 14 at the circumference of the cladding region 13. The center core region 11 is doped by germanium (Ge) to increase its refractive index. Thus, the refractive index of the center core region 11 is higher than the refractive index of the cladding region 13. Also, the outer core layer 12 is doped with fluorine (F) to decrease its refractive index. Thus, the refractive index of the outer core layer 12 is lower than the refractive index of the cladding region 13. Furthermore, the cladding region 13 is made from pure silica-based glass without adding thereto a refractive-index adjusting dopant. Finally, the coating layer 14 is made from ultraviolet cured resin.

Optical fiber 1 has a cutoff wavelength of shorter than 1530 nm. Thus, it can be used for a broadband single-mode optical transmission in the C- and L-bands. Furthermore, at 1550 nm, optical fiber 1 has positive chromatic dispersion, bending loss that is less than 10 dB/m at a diameter of 20 mm, and an effective core area of more than 120 $\mu m^2$. As stated above, because of the small bending loss of the optical fiber 1, even if the optical fiber is bent at installation, the loss due to macrobends is small. Furthermore, since the effective core area is large, it has lower nonlinearity. Thus, it can transmit a large amount of information.

As shown in the FIG. 1, if $\Delta 11$ is the relative refractive index difference between the center core region 11 and the cladding region 13, $\Delta 21$ is the relative refractive indexes difference between the outer core layer 12 and the cladding region 13, a1 is the diameter of the center core region, and b1 is the outer diameter of the outer core layer 12; then $\Delta 11$ is in the range of 0.14~0.23% (preferably 0.17~0.22%), $\Delta 21$ is less than −0.07%, and the ratio of the diameter, a1, of the center core region 11 and the outer diameter, b1, of the outer core layer 12, b1/a1, is more than 2. Also, optical fiber 1 has a cutoff wavelength of less than 1530 nm, positive chromatic dispersion at 1550 nm, bending loss of less than 10 dB/m, and an effective core area of more than 120 $\mu m^2$.

If the effective core area of optical fiber 1 is more than 130 $\mu m^2$, it is preferable to have more than 135 $\mu m$ in the outer diameter of cladding region 13. As disclosed in A. Bjarklev and S. B. Andreasen, "Microbending characterization of optical fibres from artificially induced deformation" Electron Lett., 25, 417, (1989), a microbend due to the strain in the resin of the coating layer 14, is suppressed, and therefore prevents increase of transmission loss.

Figure 2:
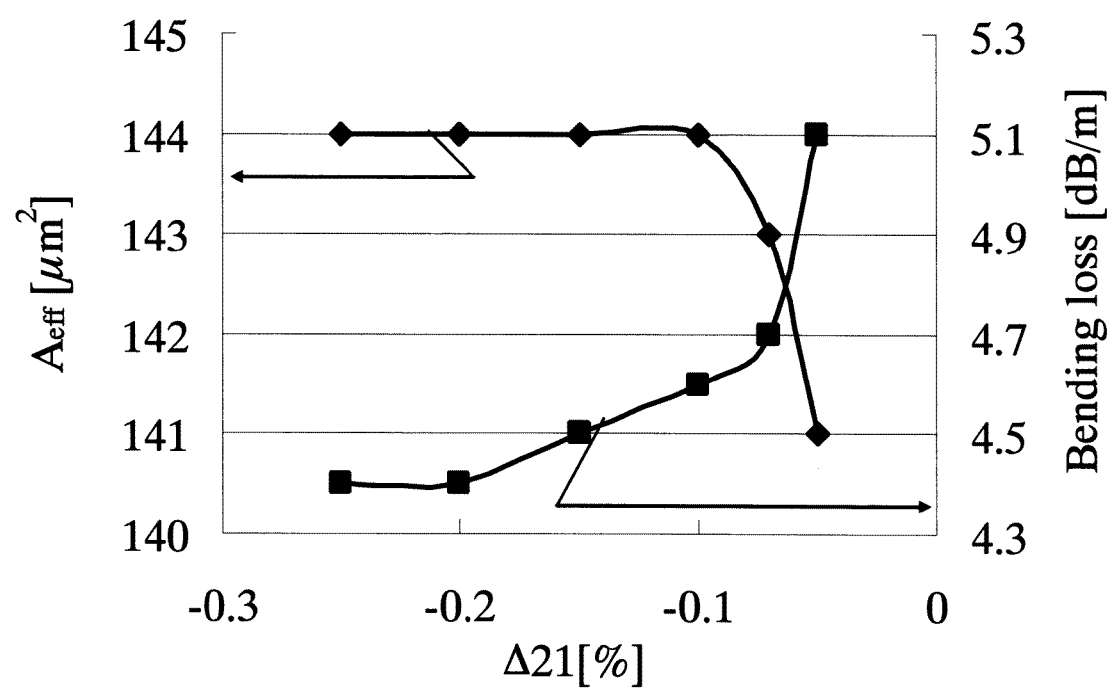
FIG. 2 is a graph, which shows relationships between Δ21 and effective core area at a wavelength of 1550 nm, and between Δ21 and bending loss at the wavelength of 1550 nm when Δ11 and b1/a1 are fixed at 0.2% and 4, respectively.

Below, the first embodiment of the present invention is explained in detail based on the results of simulation calculations. At first, the bending loss and optical characteristics of the effective core area at 1550 nm were calculated. In the calculation, $\Delta 11$ and either $\Delta 21$ or b1/a1 were fixed while another design parameter (i.e. $\Delta 21$ or b1/a1) was changed. These parameters govern the refractive index profile of the optical fiber 1. FIG. 2 is a graph, which shows relationships between $\Delta 21$ and effective core area, and between $\Delta 21$ and bending loss when $\Delta 11$ and b1/a1 are fixed at 0.2% and 4, respectively. As shown in FIG. 2, when $\Delta 21$ is changed, the change in the above optical characteristics were minor when $\Delta 21$ was below −0.07%, were very few and stabilized when $\Delta 21$ was below −0.10%, and did not change at all when $\Delta 21$ was below −0.20%. Therefore, it is desirable for $\Delta 21$ to be below −0.07%, and preferable for $\Delta 21$ to be below −0.20%. However, since further reduction of $\Delta 21$ requires more volume of F, $\Delta 21$ is desirable to be no less than −0.30%.

Figure 3:
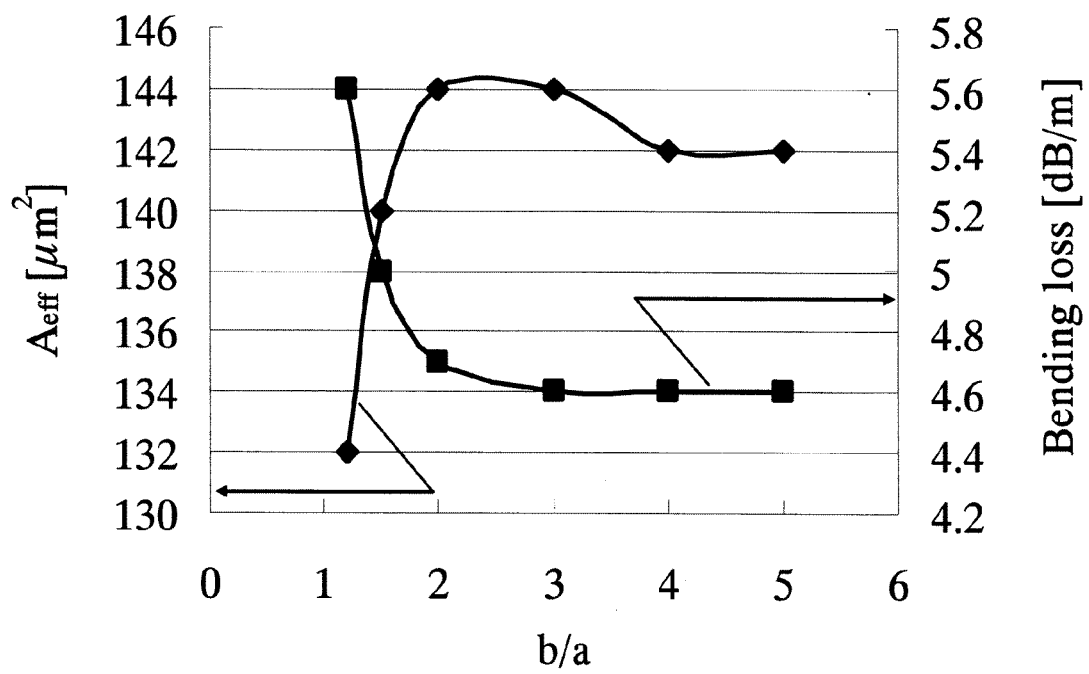
FIG. 3 is a graph, which shows relationships between b1/a1 and effective core area at the wavelength of 1550 nm, and between b1/a1 and bending loss at the wavelength of 1550 nm when Δ11 and Δ21 are fixed at 0.2% and −0.1%, respectively.

FIG. 3 is a graph, which shows relationships between b1/a1 and effective core area, and between b1/a1 and bending loss when $\Delta 11$ and $\Delta 21$ are fixed at 0.2% and −0.1%, respectively. As shown in the FIG. 3, when b1/a1 is changed, the change in the above optical characteristics were minor when b1/a1 is above 2, did not change at all when b1/a1 is above 4. Therefore, it is desirable for b1/a1 to be above 2, and preferable for b1/a1 to be 4 or more. Also, since further increase of b1/a1 requires more volume of F, b1/a1 is desirably less than 6.

Figure 4:
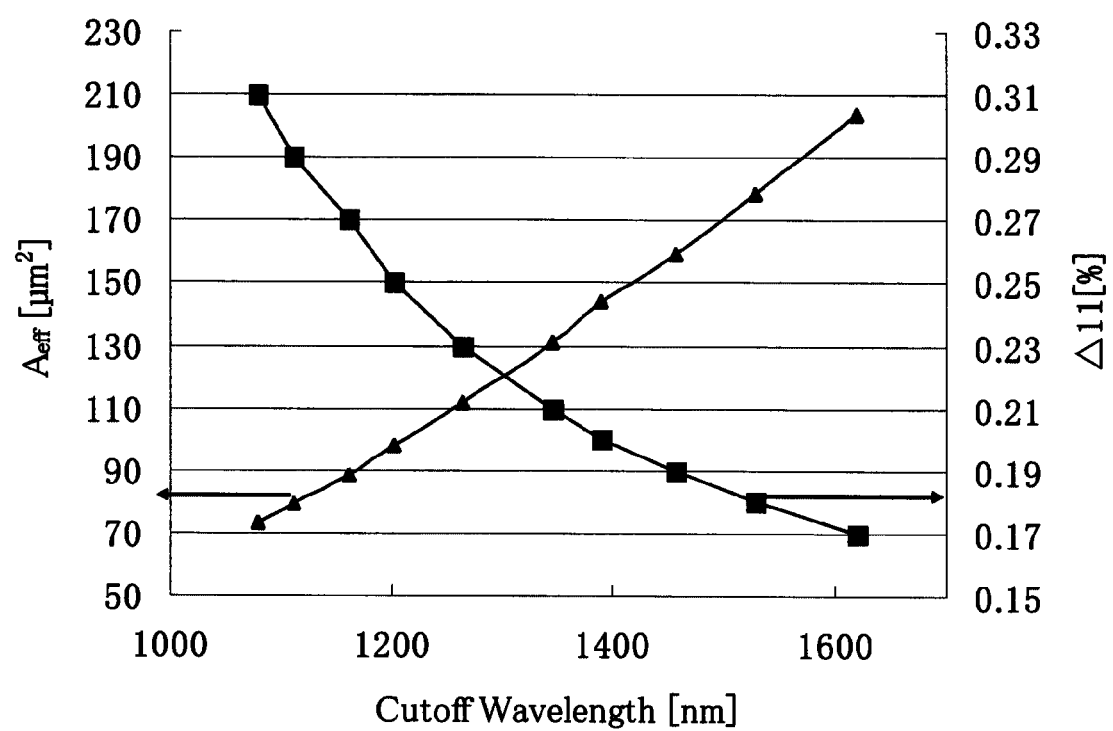
FIG. 4 is a graph, which shows relationships between cutoff wavelength and effective core area at the wavelength of 1550 nm, and between the cuttoff wavelength and Δ11 of the optical fiber shown in the FIG. 1.

Next, relationships among the cutoff wavelength, the effective core area, and $\Delta 11$ are explained. FIG. 4 is a graph which shows relationships between cutoff wavelength and effective core area, and between the cutoff wavelength and $\Delta 11$ of optical fiber 1 shown in the FIG. 1. In FIG. 4, a1 was continuously changed such that the bending loss of the fiber 1 became approximately 5 dB/m at 1550 nm when $\Delta 21$ was −0.10% and b1/a1 was 4. If the bending loss of a fiber is less than 5 dB/m at 1550 nm, the fiber can be used as an optical fiber for terrestrial transmission use, which requires low bending loss.

As shown in FIG. 4, the cutoff wavelength is approximately proportioned to the effective core area and inversely proportional to $\Delta 11$. In this configuration, the cutoff wavelength has to be below 1530 nm for single-mode transmission in the C-band. In this case, the effective core area can be expanded to 180 $\mu m^2$. To satisfy the cutoff wavelength, $\Delta 11$ is needed to be more than 0.18%. On the other hand, for single-mode transmission in the S-band, the cutoff wavelength needs to be shorter than 1460 nm. In this case, the effective core area can be expanded to 160 $\mu m^2$. To satisfy the cutoff wavelength, $\Delta 11$ needs to be more than 0.19%. Also, in order to support future high volume optical transmission, the effective core area of the optical fiber is preferably more than 120 $\mu m^2$, which is more than 1.5 times greater than the conventional SMF effective core area of 80 $\mu m^2$. To satisfy the effective core area, $\Delta 11$ needs to be less than 0.22%. Also, the inventors of the present invention have discovered that by controlling $\Delta 21$ and b1/a1, with the relative refractive index difference, $\Delta 11$, more than 0.17%, a cutoff wavelength shorter than 1530 nm can be achieved, with $\Delta 11$ less than 0.23%, an effective core area of more than 120 $\mu m^2$ can be achieved, and with $\Delta 11$ less than 0.22%, an effective core area of more than 130 $\mu m^2$ can be achieved. Furthermore, regarding the lower limit, even though other parameters are optimized, if $\Delta 11$ is less than 0.14%, the optical fiber did not satisfy less than 10 dB/m bending loss at the bending diameter of 20 mm. Also, $\Delta 11$ of more than 0.17% is needed for the optical fiber to satisfy more preferable bending loss of less than 5 dB/m.

Table 1 below shows the five combinations of design parameters, which have bending loss of 5 dB/m and the corresponding optical characteristics of the optical fiber 1 in FIG. 1. In table 1 below, "Dispersion" means chromatic dispersion, "Slope" means dispersion slope, "$A_{\it{eff}}$" means effective core area, and "$\lambda_c$" means cutoff wavelength. Also, the value of the optical characteristics, other than the cutoff wavelength, is at 1550 nm. As shown in table 1 below, if $\Delta 11$ is 0.17~0.23%, $\Delta 21$ is less than −0.07%, and b1/a1 is more than 2, then the cutoff wavelength of shorter than 1530 nm, positive chromatic dispersion, and effective core area of larger than 120 $\mu m^2$ can be achieved by keeping the bending loss at 5 dB/m or less. Also, table 2 below shows the three combinations of design parameters, which have bending loss of 10 dB/m with substantially $A_{\it{eff}}$ of 200 $\mu m^2$ or more. From such examples in Table 2, even though bending loss increases, $A_{\it{eff}}$ can be increased by setting relatively low $\Delta 11$.

TABLE 1

| No. | Δ11: % | Δ21: % | b1/a1 | a1: μm | Dispersion: ps/(nm·km) | Slope: ps/(nm²·km) | $A_{eff}$: μm² | $\lambda_c$: nm |
|---|---|---|---|---|---|---|---|---|
| 1 | 0.18 | −0.2 | 6 | 16.4 | 21.5 | 0.063 | 180.1 | 1527 |
| 2 | 0.19 | −0.1 | 4 | 15.1 | 21.3 | 0.063 | 159.3 | 1457 |
| 3 | 0.2 | −0.07 | 5 | 13.6 | 21.2 | 0.063 | 143.7 | 1411 |
| 4 | 0.21 | −0.25 | 3 | 13.4 | 20.9 | 0.062 | 129.6 | 1355 |
| 5 | 0.22 | −0.3 | 2 | 12.9 | 21 | 0.062 | 120.7 | 1314 |

TABLE 2

| No. | Δ11: % | Δ21: % | b1/a1 | a1: μm | Dispersion: ps/(nm·km) | Slope: ps/(nm²·km) | $A_{eff}$: μm² | $\lambda_c$: nm |
|---|---|---|---|---|---|---|---|---|
| 6 | 0.14 | −0.25 | 3 | 20.9 | 22.1 | 0.065 | 251.3 | 1530 |
| 7 | 0.15 | −0.2 | 4 | 19.5 | 22.1 | 0.064 | 223 | 1522 |
| 8 | 0.16 | −0.15 | 4 | 18.6 | 22 | 0.064 | 212.4 | 1507 |

In the first embodiment of the present invention, in order to create the refractive index profile shown in the FIG. 1, the center core region 11 is doped with Ge, the outer core layer 12 is doped with F, and pure silica-based glass is used for the cladding region 13. However, the present invention is not limited to this particular doping method. In order to prevent the Rayleigh scattering of Ge dopant in the center core region and to lower the transmission loss further, the above refractive index profile can be created by using pure silica-based glass for the center core region, and doping the outer core layer and the cladding region with F to reduce their refractive indexes.

Next, based on the design parameters in No. 1 and 2 of the above table 1, optical fibers for the first and second examples are manufactured by using Vapor-phase Axial Deposition (VAD) process and Outside Vapor Deposition (OVD) process. For the optical fiber for the first example, the center core region is doped by Ge, the outer core layer is doped with F, and pure silica-based glass is used as cladding region. On the other hand, for the optical fiber for the second example of the optical fiber, pure silica-based glass is used as the center core region, and the outer core layer and the cladding region is doped with F. In both the first and the second examples of the optical fiber, the outer diameter of the cladding region is 160 μm.

Figure 5:
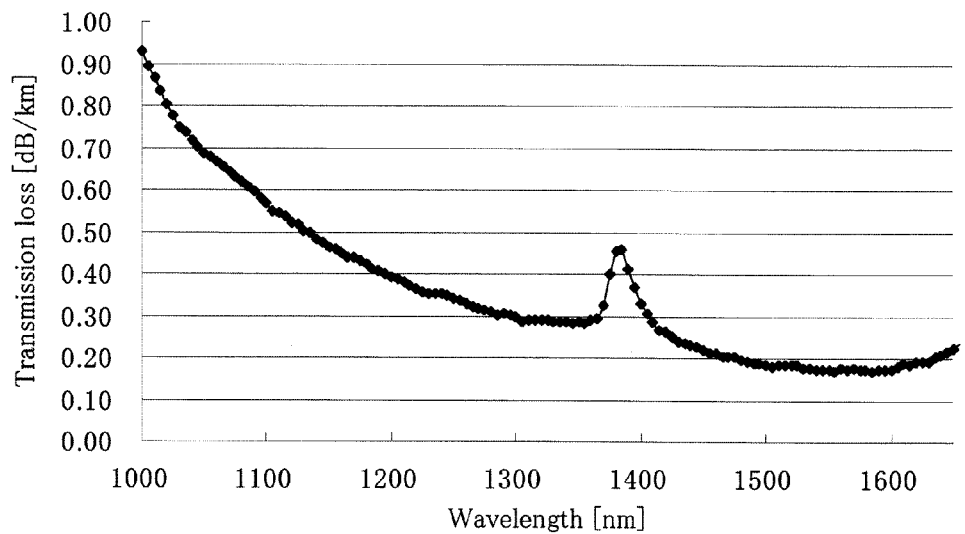
FIG. 5 is a graph, which shows transmission loss spectrum of an optical fiber, which is a second example of the first embodiment.

Table 2 below shows design parameters in No. 2 of the above table 1, and the optical characteristics of the optical fibers in the first and the second examples. In the below table 2, "DPS" means the ratio of the chromatic dispersion to the dispersion slope, and "PMD" means polarization mode dispersion. Also, the value of the optical characteristics, other than the cutoff wavelength, is at 1550 nm.

first and the second examples of the optical fiber have low PMD, those fibers can be used for large capacity optical transmissions. In addition, both of them have sufficiently small transmission loss, and transmission loss increase by microbend caused by the coating layer may not occur. Furthermore, since the pure silica-based glass is used for the center core region in the second embodiment of the optical fiber, it achieves even lower transmission loss. FIG. 5 is a graph, which shows transmission loss spectrum of the second example of the optical fiber. As shown in FIG. 5, it creates spectrum shape which does not particularly show the effect of microbending loss in the transmission loss spectrum.

Second Embodiment of the Present Invention

Next, an optical transmission system, which is related to the second embodiment of the present invention, is explained. The optical transmission system related to the second embodiment of the present invention is an optical transmission system which uses optical fibers as an optical transmission line and dispersion compensating fibers. The optical fibers used in this embodiment are optical fibers according to the first embodiment of the present invention.

Figure 6:
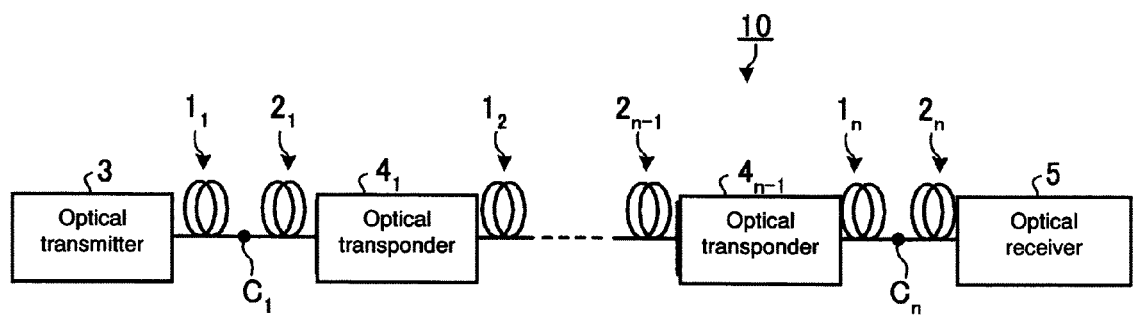
FIG. 6 is a block diagram of an optical transmission system, which relates to the second embodiment of the present invention.

FIG. 6 shows a block diagram of the optical transmission system, which relates to the second embodiment of the present invention. As shown in FIG. 6, this optical transmission system 10 has an optical transmitter 3 to transmit an optical signal that has wavelength division multiplexing in specific wavelength spectrum including the 1550 nm wavelength, optical transponders $4_1 \sim 4_{n-1}$ that recover and transmit

TABLE 3

| No | Loss: dB/km | Dispersion: ps/(nm·km) | Slope: ps/(nm²·km) | DPS: nm | $\lambda_c$: nm | $A_{eff}$: μm² | Bending loss: dB/m | PMD: ps/√km |
|---|---|---|---|---|---|---|---|---|
| 2 (from table 1) | — | 21.3 | 0.062 | 344 | 1457 | 159.3 | 4.7 | — |
| First example | 0.193 | 21.4 | 0.061 | 351 | 1451 | 158.8 | 4.5 | 0.045 |
| Second example | 0.173 | 21.7 | 0.061 | 356 | 1462 | 159.1 | 4.2 | 0.042 |

As shown in the above table 2, both of the first and the second examples of the optical fiber show approximately the same optical characteristics as the design parameters in No. 2 of the above table 1, and it shows that the optical fibers are manufactured as it is intended to be. Also, since both of the the optical signal which the optical transmitter 3 generated, and an optical receiver that receives the optical signal which the optical transponder $4_{n-1}$ recovered and transmitted. Optical transmitter 3, optical transponder $4_1 \sim 4_{n-1}$ and optical receiver 5 are connected by the optical fibers $1_1 \sim 1_n$ and the dispersion-compensating fibers $2_1 \sim 2_n$, which comprise the optical transmission line. The optical fibers $1_1 \sim 1_n$ and the dispersion compensating fibers $2_1 \sim 2_n$ are connected in connection points $C_1 \sim C_n$. In the specification, n is integral numbers of 2 or more.

Optical fibers $1_1 \sim 1_n$ are all the same as the optical fiber 1 shown in FIG. 1. Therefore, all of the optical fibers $1_1 \sim 1_n$ have: cutoff wavelengths shorter than 1530 nm; positive chromatic dispersions; bending losses of less than 10 dB/m of; and the effective core areas of more than 120 µm² at 1550 nm.

On the other hand, in the predetermined wavelength spectrum including 1550 nm, the dispersion-compensating fibers $2_1 \sim 2_n$ have negative chromatic dispersions to compensate the chromatic dispersion of the optical fibers $1_1 \sim 1_n$. Accordingly, the accumulate dispersion of the optical transmission line, which combined the optical fibers $1_1 \sim 1_n$ and the dispersion compensating fibers $2_1 \sim 2_n$, is extremely small. Therefore, distortion of the optical signals due to the chromatic dispersion is restrained. Also, as mentioned above, optical fibers $1_1 \sim 1_n$ have the large effective core areas, and therefore, they are extremely low in nonlinearity. As a result, the optical transmission system 10 realizes a broadband and large capacity WDM optical transmission system. The dispersion compensating wavelength band is configured to match with the wavelength band of the optical signal, for example, combination of the C-band and other wavelength band such as the S-band and/or the L-band. The dispersion-compensating wavelength band can be configured by controlling the chromatic dispersions and the dispersion slopes of the dispersion-compensating fibers $2_1 \sim 2_n$.

Below, an embodiment of the dispersion-compensating fiber used in the optical transmission system 10 is explained. Optical fibers $1_1 \sim 1_n$, have the optical characteristics shown in No 2 of the above tables 1 and 2, and has a DPS of about 350 nm.

Figure 7:
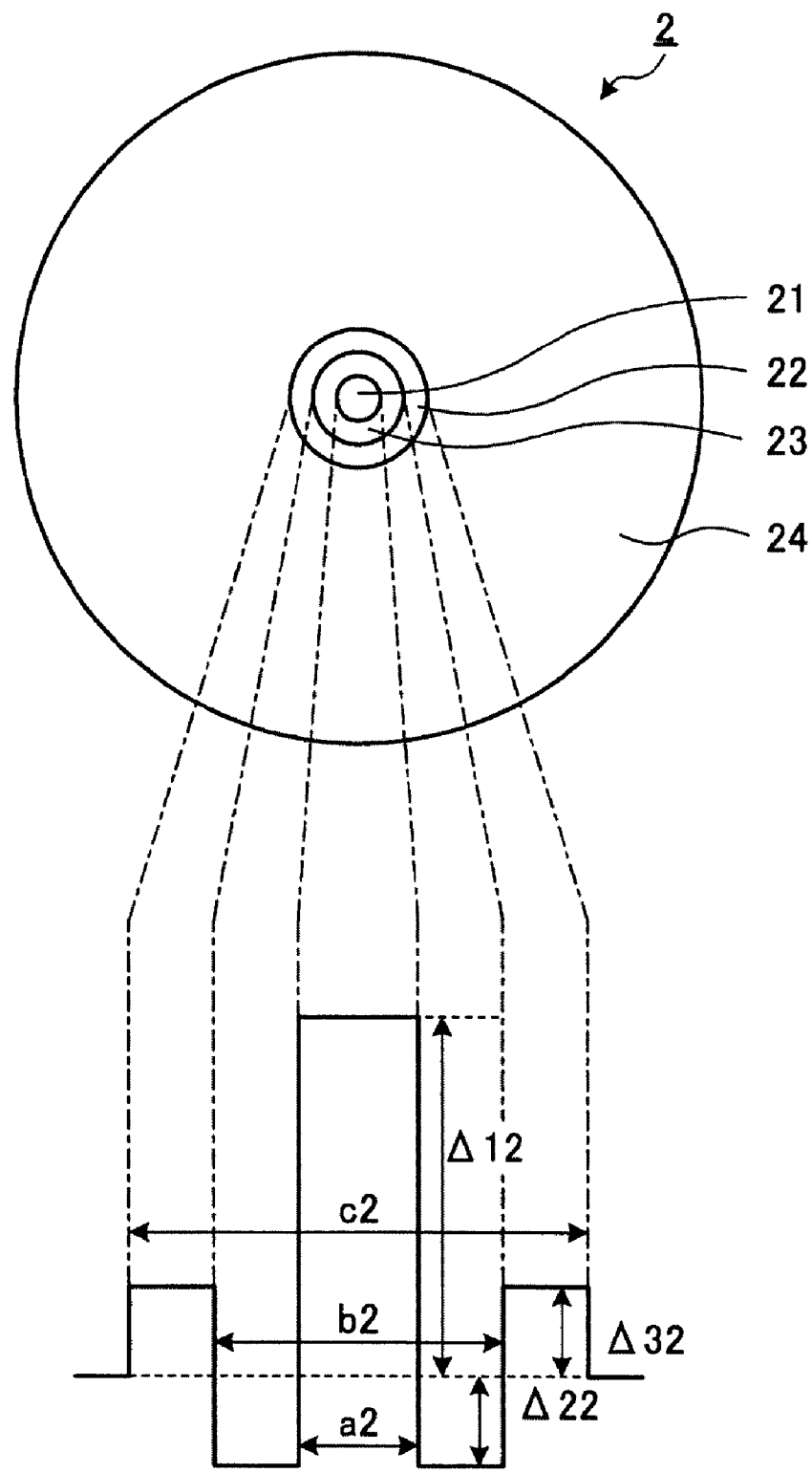
FIG. 7 is a diagram of an effective core area and a refractive index profile of a dispersion-compensating fiber, which is used in the optical transmission system shown in the FIG. 6.

FIG. 7 shows a diagram of a area and a refractive index profile of the dispersion-compensating fiber, which is used in the optical transmission system 10 shown in FIG. 6. As shown in FIG. 7, the dispersion-compensating fiber 2, made from silica-based glass, has: a center core region 21; an inner core layer 22; and an outer core layer 23 in the core region; and a cladding region 24 at the circumference of the core region. Also, it has a coating layer (not shown), made from a resin, at the circumference of the cladding region. The center core region 21 is doped with Ge and has higher refractive index than cladding region 24. Also, the inner core layer 22 is doped with F and has a lower refractive index than cladding region 24. The outer core layer 23 is doped with Ge and has higher refractive index than cladding region 24. Furthermore, cladding region 24 is made from pure silica-based glass.

In fiber 2, Δ12, the relative refractive index difference between the center core region 21 and the cladding region 24, is 2.5%; Δ22, the relative refractive index difference between the inner core layer 22 and the cladding region 24, is −0.57%; and Δ32, the relative refractive index difference between the outer core layer 23 and the cladding region 24, is 0.5%. Furthermore, the ratio of the outer diameter, c2, of the outer core layer 23 and the diameter, a2, of the center core region 21, a2/c2, is 0.19; the ratio of the outer diameter c2 of the outer core layer 23 and the outer diameter b2 of the inner core layer 22, a2/b2, is 0.54; and c2 is 13.2 µm. From those design parameters, the calculated optical characteristics of the dispersion-compensating fiber 2 are: cutoff wavelength of 1211 nm; chromatic dispersion of −177.4 ps/(nm·km), dispersion slope of −0.502 ps/(nm²·km); DPS of 354 nm; effective core area of 13.4 µm²; and bending loss of 0.8 dB/m, at 1550 nm (except the cutoff wavelength).

The dispersion-compensating fiber 2 has a DPS of 354 nm as mentioned above. Thus, when the dispersion-compensating fiber 2 is used for the dispersion-compensating fibers $2_1 \sim 2_n$ in the optical transmission system 10, since their DPS is very close to the DPS of the optical fiber $1_1 \sim 1_n$ (DPS=344 nm), the dispersion-compensating fibers can compensate the optical fiber $1_1 \sim 1_n$ in even broader spectrum.

When the above dispersion-compensating fiber 2 is manufactured by using VAD and OVD processes, the optical characteristics are: cutoff wavelength of 1249 nm; chromatic dispersion of −176.4 ps/(nm·km); dispersion slope of −0.531 ps/(nm²·km); DPS of 322 nm; effective core area of 13.9 µm²; and bending loss of 0.2 dB/m at 1550 nm (except the cutoff wavelength), and it shows that the dispersion-compensating fiber 2 is manufactured as it is intended to be. Also, other optical characteristics include a transmission loss of 0.731 dB/km and PMD of 0.338 ps/vkm at 1550 nm, which are all desired values.

Figure 8:
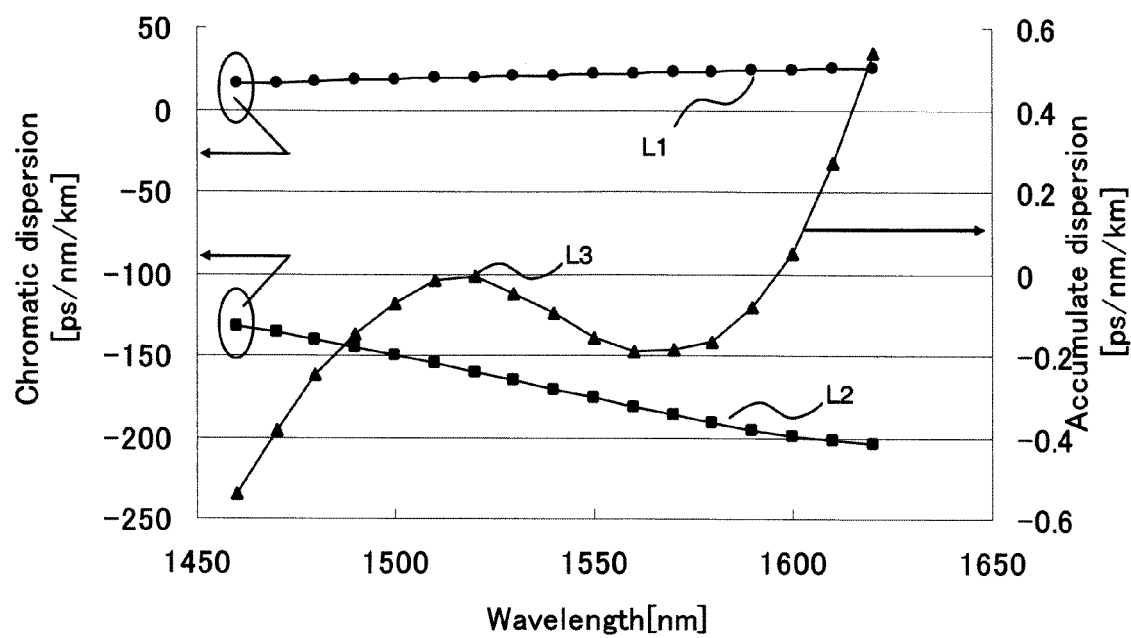
FIG. 8 is a graph, which shows chromatic dispersion of an optical fiber in the first embodiment and the manufactured dispersion-compensating fiber, and the accumulate dispersion of the created optical transmission line.

Next, a 100 km-long dispersion-compensated optical transmission line was made by combining the optical fiber 1 in the first embodiment and the dispersion-compensating fiber manufactured in the above. FIG. 8 shows a graph which shows the chromatic dispersions of the optical fiber in the first embodiment and the manufactured dispersion compensating fiber, and accumulate dispersions of the created optical transmission line. In the FIG. 8, line L1 shows the chromatic dispersions of the optical fiber in the first embodiment, line L2 shows the chromatic dispersions of the dispersion compensating fiber, and line L3 shows the accumulate dispersions of the optical transmission line.

As shown in FIG. 8, in the created optical transmission line, the accumulate dispersion is compensated within ±0.55 ps/nm/km in the wavelengths of 1460~1620 nm across the S to the L-bands, furthermore, the accumulate dispersion in the wavelengths of 1480~1600 nm (total of 120 nm) is even compensated within ±0.1 ps/(nm·km). Therefore, the optical transmission line is suitable for broadband and large capacity optical transmission.

What is claimed is:

1. An optical fiber made from fused silica comprising:
   a core region;
   a cladding region at the circumference of the core region;
   a coating layer made from a resin at the circumference of the cladding region; and has
   a cutoff wavelength of shorter than 1530 nm,
   a positive dispersion at a wavelength of 1550 nm,
   a bending loss of less than 10 dB/m at a bending diameter of 20 mm at the wavelength of 1550 nm, and
   an effective core area larger than 130 µm² and an outer diameter of the cladding region is larger than 135 µm.

2. The optical fiber of claim 1, wherein the cutoff wavelength is shorter than 1460 nm.

3. The optical fiber of claim 1, wherein the bending loss at the bending diameter of 20 mm is less than 5 dB/m at the wavelength of 1550 nm.

4. The optical fiber of claim 1, wherein the core region has
   a center core region whose refractive index is higher than the refractive index of the cladding;
   an outer core layer having a refractive index is lower than the refractive index of the cladding at the circumference of the center core region;
   a relative refractive index difference between the center core region and the cladding region is 0.14~0.23%;
   a relative refractive index difference between the outer core layer and the cladding region is less than −0.07%; and
   a ratio of a diameter of the center core region to an outer diameter of the outer core layer is more than 2.

5. The optical fiber of claim 4, wherein the relative refractive index difference between the center core region and the cladding region is 0.17~0.22%.

6. The optical fiber of claim 4, wherein the center core region is made from pure silica-based glass.

\* \* \* \* \*